Figure 8:
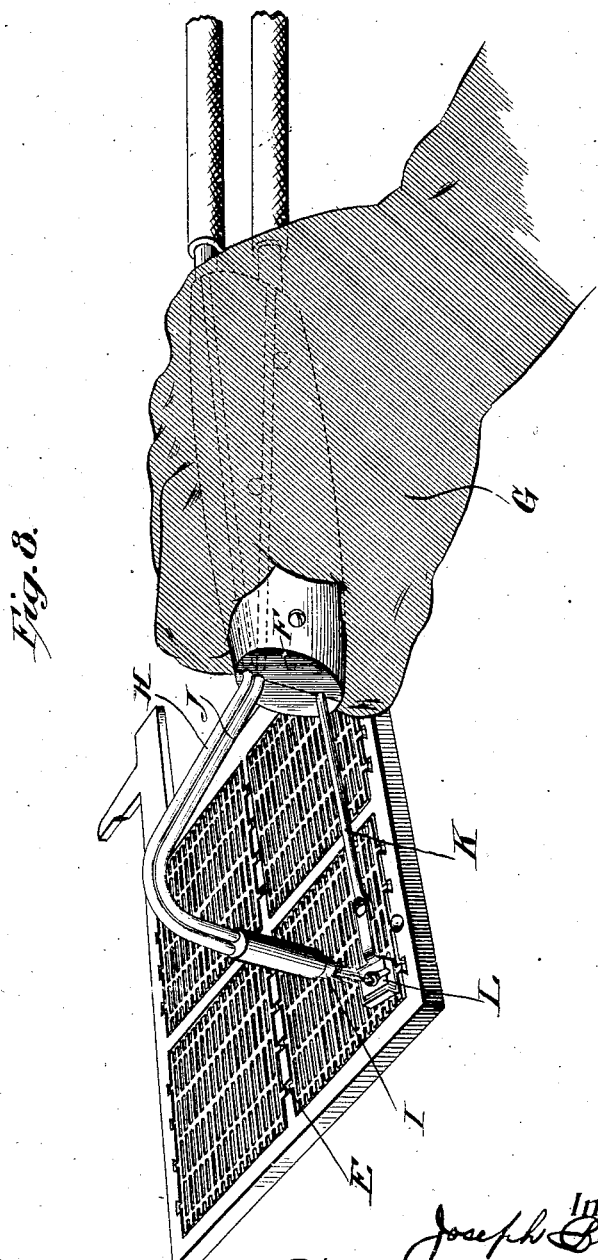

No. 854,326. PATENTED MAY 21, 1907.
J. BIJUR.
BATTERY PLATE AND PROCESS OF MAKING SAME.
APPLICATION FILED AUG. 14, 1906.
2 SHEETS—SHEET 1.
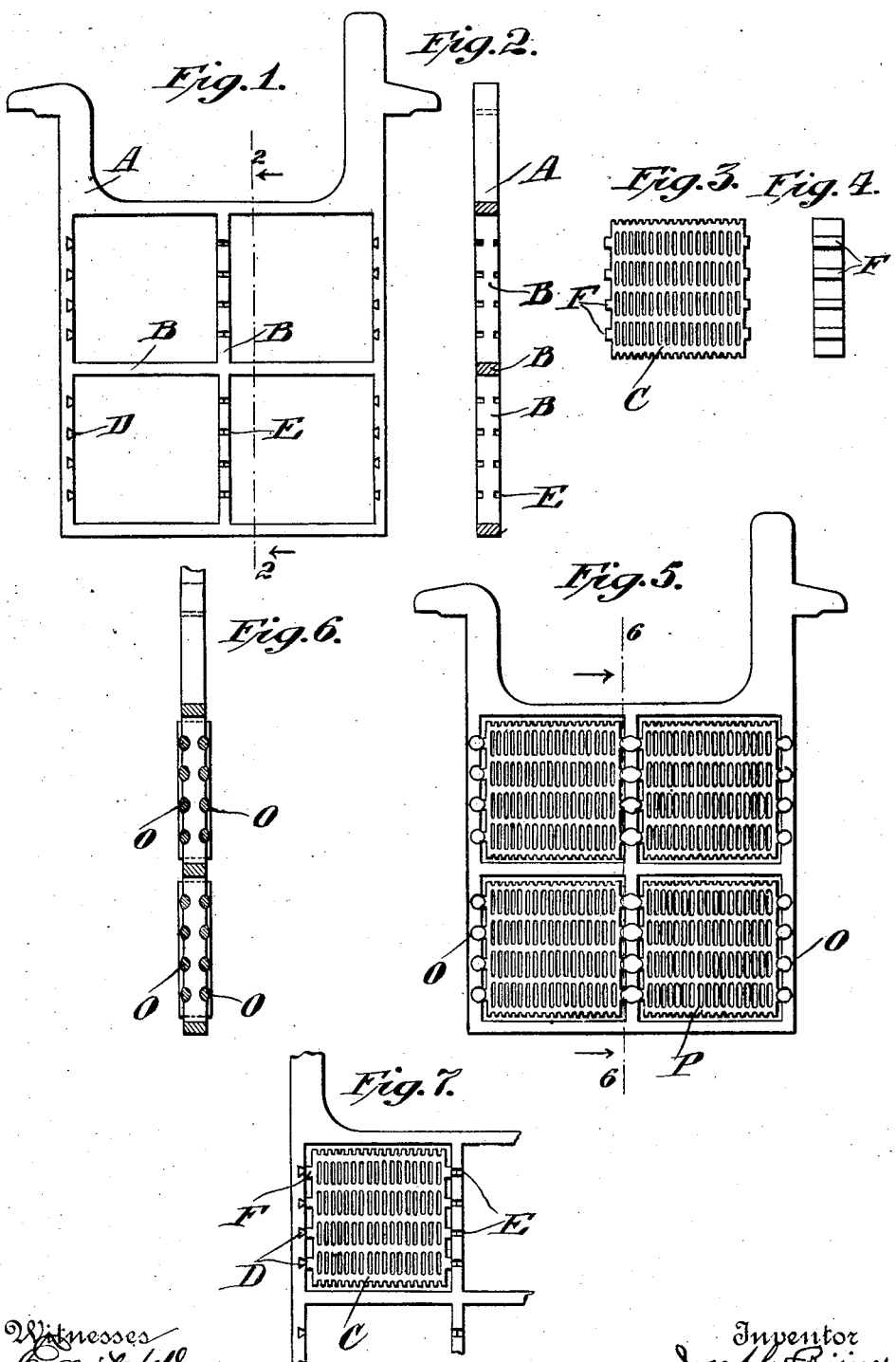

No. 854,326. PATENTED MAY 21, 1907.
J. BIJUR.
BATTERY PLATE AND PROCESS OF MAKING SAME.
APPLICATION FILED AUG. 14, 1906.

2 SHEETS—SHEET 2.

Attest:

Inventor:
Joseph Bijur
by Dickerson Brown,
Raegener & Binney Attys.

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

BATTERY-PLATE AND PROCESS OF MAKING SAME.

No. 854,326.  Specification of Letters Patent.  Patented May 21, 1907.

Application filed August 14, 1906. Serial No. 330,524.

*To all whom it may concern:*

Be it known that I, JOSEPH BIJUR, a citizen of the United States, and a resident of the borough of Manhattan, city, county, and State of New York, have invented certain new and useful Improvements in Battery-Plates and Process of Making Same, of which the following is a specification, accompanied by drawings.

This invention relates to an improved battery plate and the process of making the same, and the objects of the invention are to enable a plate of substantial construction to be made quickly and to cheapen the cost of manufacture.

Further objects of the invention will hereinafter appear and to these ends the invention consists of the plate and process of making same substantially as hereinafter fully described and claimed in this specification and shown in the accompanying drawings, in which,—

Figure 1 is a plan view of the frame of the plate; Fig. 2 is a sectional view on the line 2—2 of Fig. 1, looking in the direction of the arrows; Fig. 3 is a plan view of one of the active portions in the form of a grill; Fig. 4 is a side view of Fig. 3; Fig. 5 is a plan view of a complete plate; Fig. 6 is a sectional view on the line 6—6 of Fig. 5, looking in the direction of the arrows; Fig. 7 is a detail plan view of a portion of the frame and active portion before welding; Fig. 8 is a perspective view showing the plate being made.

In accordance with this invention the battery plate consists of the frame, and active portions welded thereto at different points by lead or alloy. The frame A is preferably provided with ribs B and the active portions in this instance are preferably shown as grids or grills C adapted to be placed in the spaces between the frame and ribs, and suitably secured therein in substantially the same plane as the frame, although other suitable constructions of the plate may be provided for carrying out the invention and the invention is not limited to a frame and active portions of the character described. The frame and ribs are preferably made of alloy and the active portions are of lead.

The active portions and frame are united in accordance with my improved process of making battery plates, which consists broadly in superheating a globule of lead or alloy to a degree at which it is capable of superficially fusing the surfaces it touches and depositing it in that condition in a suitable place for uniting the parts of the battery plate.

The active portions or grills C, as shown, are arranged in the frame and in close proximity thereto, and in order to unite the active portion to the frame the superheated globule of lead or alloy is deposited between the meeting surfaces of the parts, thereby welding said surfaces together.

Preferably the frame is provided with pockets D, and the ribs B are also provided with pockets E, while the grills are preferably provided with lugs F adapted to register with the pockets D and E when the active portions are placed in the frame. The globules of superheated lead or alloy are poured into the pockets D and E and fused simultaneously with the surfaces of the frame and active parts before solidifying, thereby welding the parts firmly together and making a substantial construction for the plate.

Any suitable apparatus or devices may be used for superheating the globule of lead and pouring it at the desired points. In Fig. 8 a blow-pipe is shown, provided with a handle F adapted to be grasped by the hand G. One tube, as for instance H, conducts gas to the burner tip I, while the other tip J conducts air under pressure to the tip. A rod K extending from the handle F supports an asbestos crucible L hollowed to receive a globule of lead and constructed to enable the superheated globule to be poured from the crucible at the desired points in the plate. Preferably in pouring the globules into the pockets in the sides of the frame the blow-pipe is held in substantially the position indicated in Fig. 8 so that danger of fusing adjacent parts of the grills is obviated. In pouring the globules into the pockets E in the ribs of the frame the blow pipe is held substantially parallel with the bottom of the plate, that is at right angles to the position indicated in Fig. 8, to enable the most efficient results to be obtained, although of course the pouring may be carried out in any desired manner, and any suitable apparatus may be used for this purpose.

After the globules have been poured into the pockets on one side of the plate, forming a plate like that illustrated in Fig. 5, in which O represents the globules after they have solidified, the plate is turned over and the same process is carried out for the other side. In Fig. 6 a section through the completed plate is taken, showing the solidified globules on each side in section.

The globule of lead or alloy is superheated to such a temperature that the oxid on its surface readily fuses and combines with the hydrocarbon of the heating flame to leave the incandescent metallic portion of the drop free to unite with the solid metallic parts of the plate. The globule should be poured into a pocket while superheated and while free from oxid. The temperature of the globule should be sufficiently high to render it capable of fusing simultaneously with the surfaces of the frame and active portion before the globule solidifies, and the drop should be deposited immediately after it reaches the desired condition, because if cooled down too much as by flowing for a substantial distance over metallic surfaces the drop would not be capable of uniting with the desired portions of the plate.

The active portions or grills are firmly held in position by true welds when the plate is completed and a strong and substantial construction is secured which will withstand rough usage. The parts are not merely soldered together but welded by true welds. As shown, the active portions are united to the frame at a plurality of independent and isolated points, and these points are preferably intermediate of the cross supports P on the grills C so that provision for expansion in the active portion is provided.

Obviously some features of this invention may be used without others and the invention may be embodied in widely varying forms, therefore, without limiting the invention to the devices shown and described, and without enumerating equivalents, I claim and desire to obtain by Letters Patent the following:—

1. The process substantially as herein described of making battery plates which consists in arranging the frame of the plate and the active portions in close proximity, whereby a substantial construction will result if welded together at few points, then superheating globules of lead or alloy to a degree at which they are capable of superficially fusing the surfaces they touch and depositing said globules while in that condition at different points between the frame and active portions.

2. The process substantially as herein described of uniting the parts of a battery plate, which consists in depositing globules of lead or alloy superheated to a degree at which they are capable of superficially fusing the surfaces they touch in suitable position between the frame and active portions, thereby welding the parts of the plate together at separated points.

3. The process substantially as herein described of welding the parts of a battery plate together, which consists in depositing globules of lead or alloy superheated to a degree at which they are capable of superficially fusing the surfaces they touch at isolated points between the frame and active portions.

4. The process substantially as herein described of making battery plates, which consists in arranging the frame of the plate and the active portions in close proximity in substantially the same plane, whereby a substantial construction will result if welded together at a few points, then superheating globules of lead or alloy to a degree at which they are capable of superficially fusing the surfaces they touch and immediately depositing said globules while in that condition at different points between the active portions and the frame.

5. The process substantially as herein described of making battery plates which consists in providing pockets on the frame and lugs on the active portions, arranging said parts in close proximity, with the pockets and lugs registering with each other, then superheating globules of lead or alloy to a degree at which they are capable of superficially fusing the surfaces they touch and depositing said globules while in that condition in the pockets, thereby welding the parts together at different points.

6. The process substantially as herein described of making battery plates which consists in superheating a globule of lead or alloy to a degree at which it is capable of fusing the surfaces it touches and depositing it in that condition while free from oxid in a suitable place between the surfaces of the parts of the plate for uniting said parts.

7. The process substantially as herein described of making battery plates which consists in superheating a globule of lead or alloy in a condition free from oxid, and depositing said globule while superheated and in that condition in a suitable place to make contact with a portion of the frame and a portion of the active part, to weld said parts together.

8. The process substantially as herein described of making battery plates which consists in superheating a globule of lead or alloy to a sufficiently high temperature to be capable of fusing simultaneously with the surfaces of the frame and active part before the globule solidifies, then immediately depositing said globule while superheated and free from oxid between the parts to be united.

9. The process substantially as herein described of making battery plates which consists in superheating a globule of lead or alloy to such temperature that the oxid on its surface readily fuses and combines with the hydrocarbon of the heating flame to leave the incandescent metallic portion of the drop free to unite with the solid metal parts of the plate, then immediately depositing said globule in that condition in a suitable place between the parts of the plate to unite the same.

10. The process substantially as herein described of making battery plates which consists in providing pockets on both sides of the frame and lugs on the active portions, arranging said parts in close proximity in substantially the same plane with the pockets opposite the lugs, then superheating globules of lead or alloy to a degree at which they are capable of fusing the surfaces they touch and depositing said globules in that condition in the pockets on one side of the plate and on the other side thereof to weld the active portions to the frame.

11. The process substantially as herein described of making battery plates which consists in arranging the parts to be united in close proximity, and depositing a globule of superheated lead or alloy while free from oxid between the meeting surfaces of said parts to weld them together.

12. The process substantially as herein described of uniting the active portions of a battery plate in the form of grills to the surrounding frame, which consists in arranging the grills within the frame with the edges in proximity thereto, whereby a substantial construction will result if welded to the frame at few points, then superheating lead or antimonial lead alloy in the form of globules to such temperature that the oxid on the surface of a globule readily fuses and combines with the hydrocarbon of the heating flame to leave the incandescent metallic portion of the globule free to unite with the solid metal parts of the plate, then immediately depositing said globules in that condition in a suitable place between the parts of the plate to unite the same without permitting the globules to flow over portions of the surfaces of the plate and thereby become cooled.

In testimony whereof I have signed this specification in the presence of two subscribing witnesses.

JOSEPH BIJUR.

Witnesses:
   OLIN A. FOSTER,
   A. L. O'BRIEN.